Jan. 9, 1940.  E. H. AIKEN  2,186,400
INTERNAL COMBUSTION ENGINE
Filed Feb. 9, 1938  3 Sheets-Sheet 1
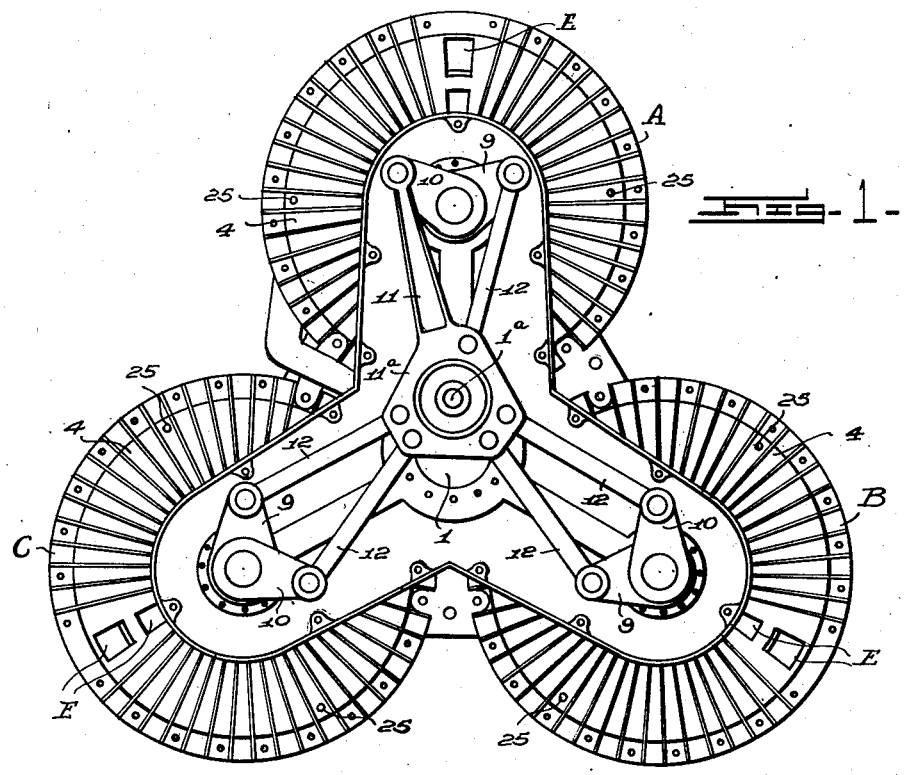
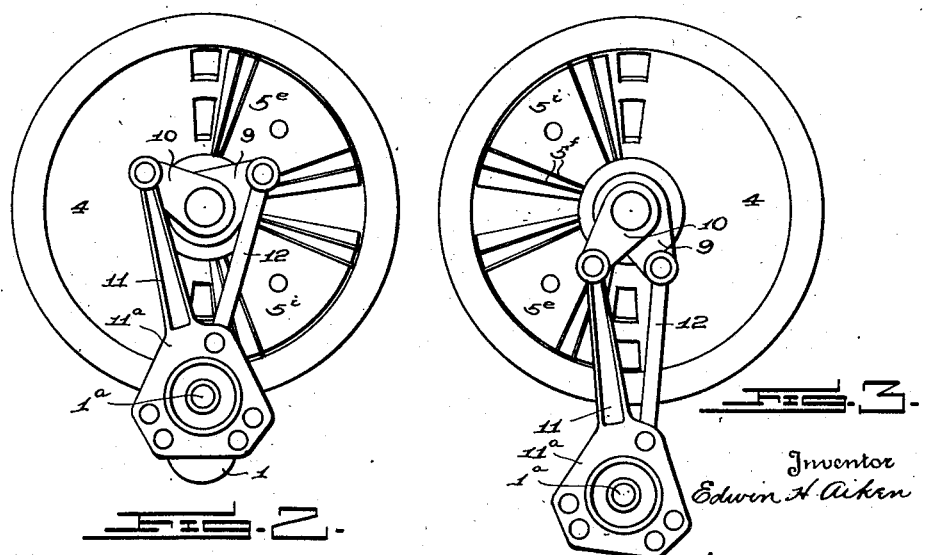
Inventor
Edwin H. Aiken
By Samuel Herrick,
Attorney

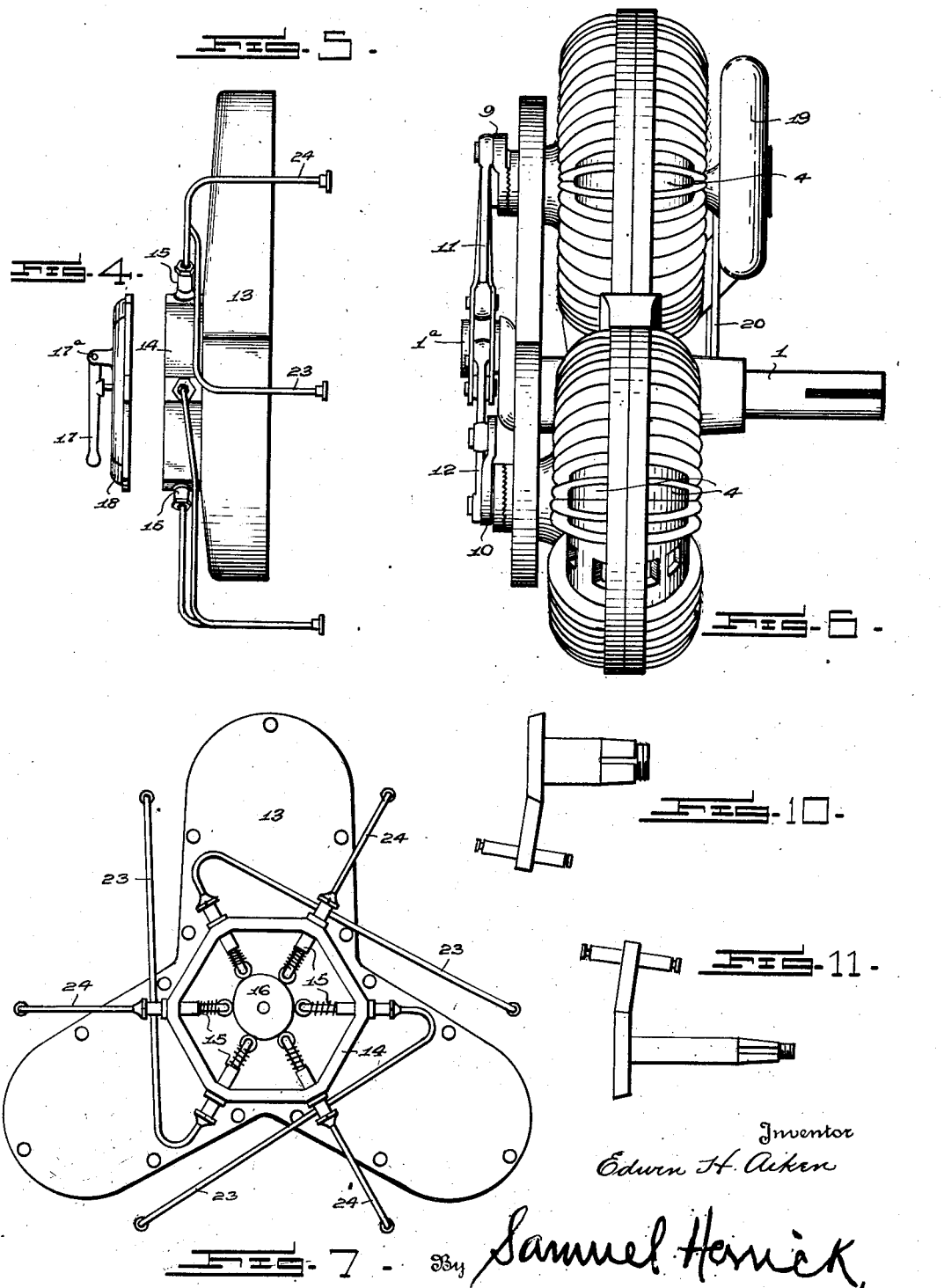

Jan. 9, 1940.                E. H. AIKEN                2,186,400
                    INTERNAL COMBUSTION ENGINE
                      Filed Feb. 9, 1938           3 Sheets-Sheet 3
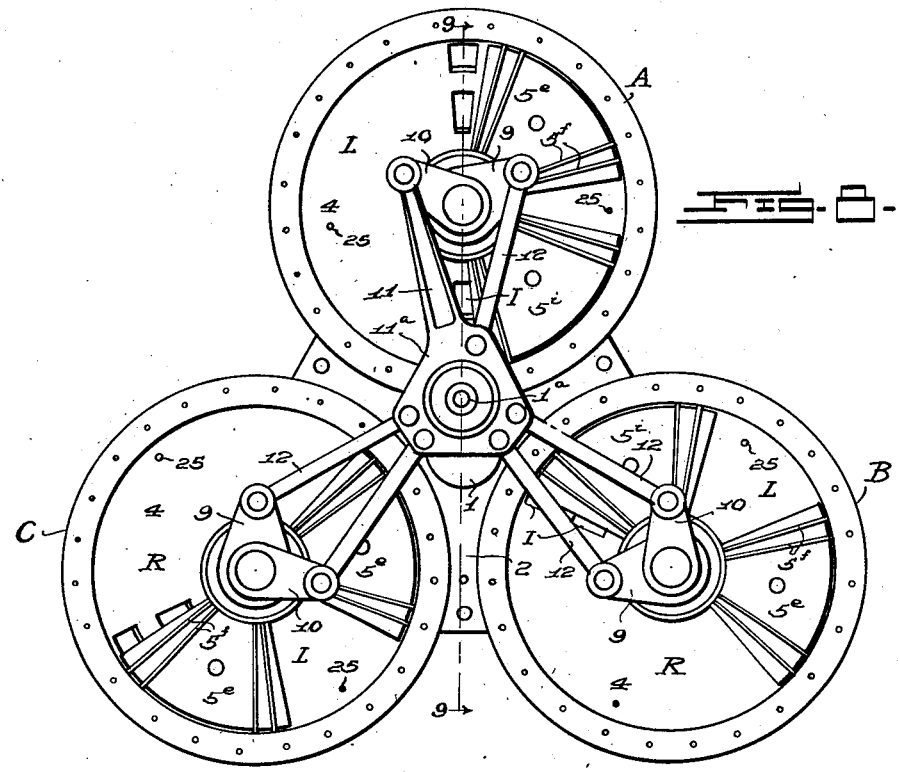
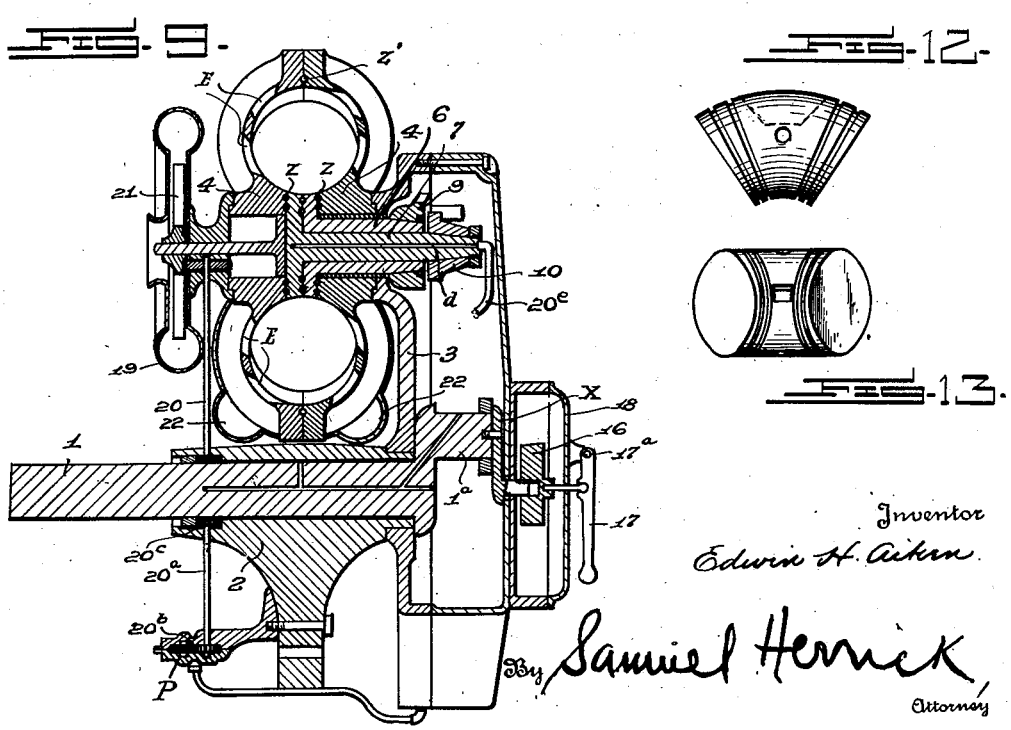
Inventor
Edwin H. Aiken
By Samuel Herrick
Attorney Patented Jan. 9, 1940

2,186,400

UNITED STATES PATENT OFFICE 2,186,400

INTERNAL COMBUSTION ENGINE

Edwin H. Aiken, El Centro, Calif.

Application February 9, 1938, Serial No. 189,654

4 Claims. (Cl. 123—18)

The present invention relates to the improvement of internal combustion engines. The device comprises a structure in which the fuel and air are compressed, mixed, ignited and expanded in much the same way that these operations occur in a two-stroke cycle Diesel engine. The exhausting of the products of combustion and the scavenging and recharging with fresh clean air are accomplished in much the same manner as that employed by the Diesel or gas engine using a scavenging pump or blower. Engines embodying the principles of this invention are applicable in practically every relation where a prime mover is needed.

It is a well known and established fact that internal combustion engines of the Diesel type are very high in weight per brake horsepower as compared to other types of prime movers. Likewise, the large number of parts commonly employed and the necessity for the accurate timing of such parts with each other add to the cost of construction, operation and repair. With this new improvement, the weight per brake horsepower is reduced very materially by the reduction of parts, and the combination of those remaining into a more compact assembly.

In the piston and cylinder type of internal combustion engines the cylinder is necessarily considerably longer than need be as far as the volume required for the expansion of gases is concerned, the extra length of the cylinder being required as a guide for the piston. This arrangement usually requires a cylinder length of from two to three (or even more) times the length of the combustion section and requires long connecting rods or cross heads to prevent excessive side thrust of the pistons against the cylinder walls.

In this improvement no extra cylinder length is required to serve as a guide and support for the pistons. That which would be two cylinders in the usual engine construction is formed into one circular ring containing two working or combustion sections. Each piston upon the expansion stroke of one section enters the compression stroke of the other section thus reducing the required length of the cylinders below that required by the straight cylinder design from fifty to sixty per cent and eliminating both cylinder heads.

In the trunk piston type internal combustion engine much wearing occurs between the piston and the cylinder due to the grinding action caused by the side thrust of the piston plus the heat, dirt and foreign matter entering the cylinder with the scavenging and charging air and fuel. To prevent this, some manufacturers use the cross-head design with the extra weight and extra parts required.

This invention removes the bearing surfaces and bearing parts from exposure to dust, dirt, abrasives and high temperatures and permits the pistons to pass through their entire travel without touching the cylinder walls. The piston rings form the sealing medium between the piston and the cylinder and bear uniformly on all sides of the cylinder walls, thus preventing the uneven wear with its consequent impairment of compression. Further, this construction seals the cylinder walls and pistons from the spraying and splashing of oils from the crank case, thereby preventing the pumping of oil and permitting the careful and close regulation and control of oils of lubrication. This improvement has the characteristics of compactness, light weight, quick acceleration, and small number of working parts.

In the accompanying drawings, wherein like numerals designate corresponding parts throughout the several figures:

Figure 1 is a side elevation of one embodiment of the invention with the connecting rod cover pan removed;

Fig. 2 is a side elevation of one of the cylinders and the associated connecting rods, with a side of the cylinder removed, and with the pistons at one of their limits of movement;

Fig. 3 is a view like Fig. 2 but with the pistons at their other limit of movement;

Fig. 4 is a side view of the cover plate which carries the throttle lever;

Fig. 5 is an edge view of the connecting rod cover and the fuel pump assembly;

Fig. 6 is an edge elevation of the engine of Fig. 1 with the connecting rod cover pan removed;

Fig. 7 is a front elevation of the connecting rod cover pan illustrated in Fig. 5;

Fig. 8 is a view like Fig. 1 but with the sides of the several cylinders removed to show the pistons within the cylinders;

Fig. 9 is a vertical section upon line 9—9 of Fig. 8;

Fig. 10 is a side elevation of one of the intake rocker shafts;

Fig. 11 is a side elevation of one of the exhaust rocker shafts, and

Figs. 12 and 13 are respectively side and under-face views of one of the pistons.

For purposes of illustration, I have chosen to show the invention embodied in a three-cylinder engine comprising the units A, B and C. In describing the operation of this invention, the unit A is taken as the basic unit since it contains the master connecting rod 11 and is an operative unit without assemblies B, C or any other units which may be connected to the wrist pin 1ª of the common crankshaft 1.

With the exception of the connecting rod 11, all parts of units B, C, etc., are interchangeable and exact duplicates of those of assembly A and are therefore given the same identifying numerals in the following description. A description of the arrangement of the elements of unit A will serve to describe the parts of the other units B and C.

1 designates a main crankshaft centrally located within the engine assembly and supported by the main spider support 2 and the secondary spider support 3, both of which are constructed with suitable main bearings for crankshaft 1. Spaced equidistant (or ninety degrees apart if only two assemblies are used) about the center line of the crankshaft 1 are the three identical cylinder assemblies A, B and C, which are rigidly secured in position by the spider supports 2 and 3.

Each of these cylinder assemblies consists of two identical depressed-dome caps or "shells" 4, which when bolted together form a continuous annular cylinder. Operating within each of these cylinders are two identical double-end pistons 5ⁱ and 5ᵉ which are mounted on rocker shafts 6 and 7 and locked in place by identical pins 8. Rocker shaft 7 is solid and passes through rocker shaft 6 extending a short distance beyond the end of 6. Rocker shaft 6 extends through one of the cylinder shells 4 and thence through spider support 3. Intake rocker arm 9 is mounted on the outer end of intake rocker shaft 6 and exhaust rocker arm 10 is mounted on the outer end of exhaust rocker shaft 7. Exhaust rocker arm 10 of assembly A is connected to crankshaft 1 by means of a "master" connecting rod 11, having an integral hub 11ª. The intake rocker arms 9 of assemblies A, B and C are pivotally connected to the hub of the master connecting rod 11 by connecting rods 12. The rocker arms 10 of assemblies B and C are pivotally connected to the hub 11ª by connecting rods 11ᵇ.

A cover 13, fitted securely to spider support 3, forms a pan for and covers the crankshaft and connecting rod assembly. On the outside of this cover 13 and centrally located is the fuel injection pump assembly consisting of the pump bracket 14 in which are mounted radially the injection pumps 15 all operating from the common adjustable load and time-regulating cam 16. This cam 16 is rotated through arm X from wrist pin 1ª and is moved endwise or parallel to its axis of rotation by the throttle or regulator arm 17 which is pivoted at 17ª on cover plate 18, which plate in turn seals the injection pump casing. The face of cam 16 is beveled, i. e., it changes in cross section from one end to the other, thereby giving a variable stroke to the pumps as it is moved parallel to the axis of 1 by lever 17.

On the drive-shaft side of the engine is placed the scavenging blower (or blowers) 19. This blower is mounted on the hub of the half cylinder shell 4 and is driven by a drive-shaft 20 which is connected through bevel or crown gears to the crankshaft 1 and to the rotor of the blower 21. An intake and scavenging manifold 22 connects the blower 19 to the intake ports of the three cylinder assemblies A, B and C. Exhaust manifolds (not shown) may be connected to the cylinder shells to take care of the exhaust gases.

From the fuel injection pumps 15, fuel lines 23 and 24 carry the fuel to the conventional fuel spray nozzles 25. These nozzles break the fuel into a fine spray or mist suitable for rapid and thorough combustion. There are two (or two pairs of) nozzles per cylinder assembly, one being placed at 180° from the other. These are preferably set at such an angle that the fuel enters tangentially, producing a circulating motion of the gases in the combustion chamber.

As will be seen from Fig. 9, the rocker shafts 6 and 7 and the half shells 4 are provided with ring grooves Z, in which are placed circular rings which seal the cylinder and prevent leakage of the gases to or from the combustion chambers. The outer circumference of the cylinder assembly is sealed by a close fitting seal ring Z', which is mortised into both half shells in the bolting or clamping section. Such other packing is contemplated as good engineering practice may dictate.

The main piston rings 5ᶠ are placed in a radial position with respect to the axis of rotation and are held in position to prevent their ends from fouling with intake or exhaust ports. The pistons are properly aligned so that they do not touch the cylinder walls at any point. Only the rings touch. Cooling of the pistons is provided by oil from the pressure lubrication system. This circulates through the pistons, being carried to and from the pistons by ducts d drilled through the mounting arm of the rocker shafts 6 and 7. The oil pump p is mounted on spider 2 and is driven by shaft 20ª and bevel or crown gears 20ᵇ, 20ᶜ from main shaft 1, and draws oil from the legs of pan 13. A piece of the oil supply conduit is illustrated at 20ᵉ. The oil pump may be otherwise mounted and driven without departure from the invention.

Referring to Fig. 1, the operation is as follows: Crank or wristpin 1, as shown in Figs. 1 and 2, is in the top dead center position with reference to assembly A. In this position, the hub 11ª of the "master" connecting rod 11 is in its uppermost position. With the rotation "clockwise," the position of 1ª is midway between top dead center of connecting rod 11 and top dead center of connecting rod 12. In this position, pistons 5ᵉ and 5ⁱ (see Fig. 2) are at their nearest proximity to each other, and the air between them in the right hand cylinder section R is compressed to its highest pressure.

At this point, fuel pump 15 begins to inject fuel through right hand nozzle 25 (Fig. 2). Combustion begins, and the expanding gas in chamber R exerts its pressure against pistons 5ᵉ and 5ⁱ, forcing 5ᵉ in a counterclockwise direction and 5ⁱ in a clockwise direction. Piston 5ᵉ rotates its rocker shaft 7 and rocker arm 10 in a counterclockwise direction forcing master connecting rod 11 downward. Piston 5ⁱ rotates its rocker shaft 6 and its rocker arm 9 in a clockwise direction, forcing connecting rod 12 downward. The resultant of the thrust on rods 11 and 12 is to produce a rotation of crankshaft 1 clockwise.

It is evident from Figs. 1, 2 and 3 that the movement of piston 5ᵉ, its rocker shaft 7, its rocker arm 10 and connecting rod 11 are ahead of piston 5ⁱ, rocker shaft 6, rocker arm 9 and connecting rod 12 by approximately the angular displacement between connecting rods 11 and 12. This advance in the position of exhaust piston 5ᵉ over intake piston 5ⁱ causes the exhaust port E to be covered ahead of intake port I and likewise causes it to be uncovered ahead of intake port I as the pistons 5ᵉ and 5ⁱ move across these two ports.

Therefore, as the gases expand in chamber R, piston 5ᵉ covers port E, closing chamber L from the exhaust line. The scavenger blower 19 continues to force fresh air through intake port I until piston 5ⁱ advances and closes port I, after which the super-charging ceases and compression of the gases in chamber L begins.

Near the end of the expansion stroke resulting from combustion of gases in chamber R, piston 5ᵉ again uncovers exhaust port E, this time providing an exhaust for the expanded gases in chamber R. Since piston 5ᵉ is ahead of piston 5ⁱ, intake port I is not uncovered until the pressure in R is materially reduced through exhaust port E. As piston 5ⁱ uncovers port I, the air from the scavenging blower 19 rushes in, forcing the remaining burned gases out through E and recharging chamber R with clean air.

At this position, the air in chamber L has been compressed, and fuel has begun to be injected through left-hand nozzle 25 (see Fig. 3). A new expansion or work stroke begins in chamber L and pistons 5ᵉ and 5ⁱ reverse their directions of motion, 5ⁱ lagging behind 5ᵉ as previously described. Piston 5ᵉ covers E and scavenging blower 19 begins to build up the pressure in R. Piston 5ⁱ then moves back across I and the compression of the air in R is begun again. As the rotation continues, piston 5ᵉ opens port E, allowing the exhausting of chamber L. Piston 5ⁱ then opens I and permits scavenging blower 19 to force fresh air into chamber L.

Thus it is seen that as pistons 5ᵉ and 5ⁱ move to the left across their respective ports E and I they exert a downward thrust on connecting rods 11 and 12 and at the same time they compress a new charge of air in chamber L. As they move to the right they exert an upward pull on the connecting rods 11 and 12 and at the same time compress a new charge of air in chamber R.

Referring to Fig. 1, it will be noted that when connecting rod 11 (assembly A) is at its top "dead center" position, the right face of piston 5ᵉ will be at its lowest position, and that at this position nozzle 25 is just clear of piston 5ᵉ. As rotation proceeds clockwise, pistons 5ᵉ and 5ⁱ both move counterclockwise until connecting rod 12 reaches its top "dead center." At the point where 12 reaches top "dead center" piston 5ⁱ likewise reaches its uppermost position with nozzle 25 just clear of the face of the piston.

It will be noted that during this rotation between the two top "dead centers" the injection of fuel has been taking place and that the injection has covered the full length of the column of compressed air. The first gases formed by the burning fuel and air follow piston 5ᵉ as it moves away from nozzle 25. Piston 5ⁱ, however, moves upward, forcing the clean air to pass through the plane of 25, thereby introducing a new supply of oxygen and preventing a retarding of combustion due to an over supply of fuel per volume of air.

This action, together with the spiralling motion of the air produced by the angular intake and exhaust ports, assures complete and rapid combustion. This same cycle takes place in chamber L and all corresponding chambers (L's and R's) in assemblies B and C. The same process takes place in cylinder assemblies B and C except that the various cycles occur 120° and 240° respectively after they have occurred in assembly A. Thus, for each revolution of crankshaft 1 there are six work strokes. The resultant force produces a rotating torque on crankshaft 1 which is almost continuous in intensity.

Intake ports I and exhaust ports E are cut through the cylinder walls 4 (see Figs. 1 and 9) at an angle to the radius of the cylinder cross sections through the ports. This angle causes the air to leave and enter the cylinder with a spiralling motion which assures complete scavenging and produces controlled turbulence during the injection and combustion periods, thereby assuring complete and efficient combustion. The fuel jets may also be set at an angle so that this swirling is intensified as the fuel is injected into the cylinder.

Cam 16 is mounted upon and driven by a splined shaft which permits the sliding of cam 16 parallel to its axis of rotation while in motion. Cam 16 is tapered or beveled and also shaped so that when in one extreme position it gives full stroke to the fuel plungers or "full throttle" by providing the proper advance of injection ahead of dead center.

At the other extreme position it will give minimum stroke or "idling throttle" and will retard the injection timing to produce smooth, even rotating torque at low speeds and light loads. Control lever 17 controls the position of cam 16 along its axis, as stated. The splined shaft is connected through arm X to the end of crankshaft 1 and is rotated at the same speed as that of the crankshaft.

Fuel is fed to the injection pumps 15 through a duct or passage $m$ drilled lengthwise of the walls of pump bracket 14 and connecting with all six pumps. The pumps when secured in place make connection with this duct and draw their fuel supply from it. The duct is connected to the fuel supply tank by suitable tubing, not shown.

When constructed for air cooling, the shells 4 are cast or forged with cooling vanes. These vanes form the cooling medium and also strengthen the shells by forming an arched dome or crown bracing. This construction is very effective in resisting any force which tends to bulge or distort the crown. The heavy bolting rims of the shells 4 resist any change in diameter and prevent the cylinder blocks from becoming "out-of-round" and deflecting under unbalanced loads. If desired, the shells may be cast with suitable water passages therearound to provide for water cooling.

It is to be understood that the invention is not limited to the precise construction set forth, but that it includes within its purview whatever changes may fairly come within either the terms or the spirit of the appended claims.

Having described my invention, what I claim is:

1. An internal combustion engine comprising a main transversely extending crank shaft having a crank and offset wrist pin upon the end thereof, a plurality of operating units disposed concentrically around said crank shaft, each of said units comprising an annular cylinder and a pair of opposed pistons therein, and a pair of concentric rocker shafts to which said pistons are respectively connected and which are moved in opposite directions by said pistons, a plate-like hub pivotally mounted upon the wrist pin of the main crank shaft, a connecting rod rigid with respect to said hub and pivoted to the crank of one of the rocker shafts of one of the units, a second connecting rod pivotally connected at one end to the hub and at the other end to the crank arm of the other rocker shaft of said unit, corresponding concentric rocker shafts and cranks thereon for the other of said units, and a pair of connecting rods for each of said units pivotally connected to the respective crank arms of said units and also each pivotally connected to the plate-like hub as described.

2. A structure as recited in claim 1, wherein each of the annular cylinders is provided with substantially diametrically opposed exhaust and air inflow ports, the said connecting rod that is rigid with respect to the plate-like hub constituting a master connecting rod which maintains such position of the plate-like hub with respect to one of the connecting rods as to cause the pistons which control the exhaust ports to move slightly in angular advance over the pistons which control the air inflow ports, as and for the purposes set forth.

3. An internal combustion engine comprising an annular cylinder, means for through scavenging from an intake port to a diametrically opposite exhaust port, a pair of pistons oscillating in opposite directions in said cylinder with one piston in slight angular advance of the other and compressing between them, on either side alternately, the clear air introduced through the intake port, means for discharging fuel into the compressed air at diametrically opposite points approximately midway between intake and exhaust ports, with the resulting combustion and expansion occurring in the cylinder between the pistons, a pair of concentric oscillatory shafts, one of which is connected to each of said pistons, a crank arm upon the outer end of each said oscillatory shaft, set upon opposite sides of center of concentric oscillatory shafts, a main crankshaft, a master connecting rod connecting one of said crank arms with said main crankshaft, and a secondary connecting rod pinned to the master rod and the second crank arm, and giving the second crank arm and its exhaust piston an angular advance over the first crank arm and its intake piston.

4. An internal combustion engine consisting of two double head pistons, each mounted on a rocker shaft and hinged and oscillating about a common axis, the pistons operating in partial opposition to each other, an annular casing having a piston chamber concentric with the axis of the piston assembly and forming a continuous cylinder about the pistons, this cylinder being separated into two equal sections by an intake port and an exhaust port through the cylinder wall at diametrically opposite points, the intake port being controlled by one of the pistons passing across it and uncovering it at and near the beginning and the end of each oscillation, the exhaust port being controlled in the same manner and in advance of the intake port by the other piston, a common crankshaft, one rocker arm and connecting rod unit per piston, said connecting rod linking the piston rocker shaft with the common crankshaft and maintaining the exhaust piston in advance of the intake piston and transmitting energy between the pistons and the common crankshaft, means for through scavenging of either cylinder section, alternately, from the common intake port through the common exhaust port, means for injecting fuel into air compressed in said cylinder sections, alternately, at points diametrically opposite each other and midway between the intake and exhaust ports.

EDWIN H. AIKEN.